United States Patent
Kondo

(10) Patent No.: US 12,548,976 B2
(45) Date of Patent: Feb. 10, 2026

(54) DRIVE CIRCUIT AND LIGHT SOURCE DEVICE

(71) Applicant: NICHIA CORPORATION, Anan (JP)

(72) Inventor: Hideki Kondo, Yokohama (JP)

(73) Assignee: NICHIA CORPORATION, Anan (JP)

( * ) Notice: Subject to any disclaimer, the term of this patent is extended or adjusted under 35 U.S.C. 154(b) by 718 days.

(21) Appl. No.: 17/945,086

(22) Filed: Sep. 15, 2022

(65) Prior Publication Data

US 2023/0098998 A1   Mar. 30, 2023

(30) Foreign Application Priority Data

Sep. 24, 2021   (JP) ................................. 2021-155191

(51) Int. Cl.
  *H01S 5/0683*   (2006.01)
  *H01S 5/042*    (2006.01)
  *H01S 5/068*    (2006.01)

(52) U.S. Cl.
  CPC ........ *H01S 5/06835* (2013.01); *H01S 5/0428* (2013.01); *H01S 5/06808* (2013.01); *H01S 5/06825* (2013.01)

(58) Field of Classification Search
  CPC ............... H01S 5/0428; H01S 5/06835; H01S 5/06808; H01S 5/06825; H05B 47/10–14
  See application file for complete search history.

(56) References Cited

U.S. PATENT DOCUMENTS

| | | | |
|---|---|---|---|
| 4,945,541 A | 7/1990 | Nakayama | |
| 6,091,747 A | 7/2000 | Morita et al. | |
| 2003/0210084 A1 | 11/2003 | Kabayama et al. | |
| 2009/0261756 A1 | 10/2009 | Tolle et al. | |
| 2010/0309938 A1* | 12/2010 | Fujita | G11B 7/126 372/25 |
| 2011/0228802 A1* | 9/2011 | Furuse | H01S 5/0428 372/38.02 |
| 2014/0036945 A1* | 2/2014 | Rabe | H01S 5/0428 372/29.021 |

(Continued)

FOREIGN PATENT DOCUMENTS

| | | |
|---|---|---|
| JP | 02-073682 | 3/1990 |
| JP | 09-098132 | 4/1997 |

(Continued)

*Primary Examiner* — James A Menefee
(74) *Attorney, Agent, or Firm* — MORI & WARD, LLP

(57) ABSTRACT

A drive circuit that includes a switching circuit switching between a first state and a second state to cause a light-emitting element to perform pulse oscillation, and a direct current adjustment circuit. In the first state, light is emitted from a light-emitting element by supplying the light-emitting element with a current having a magnitude equal to or greater than a threshold current enabling the light-emitting element to emit light having an output equal to or greater than a predetermined output. In the second state, the magnitude of the current supplied to the light-emitting element is less than the threshold current. The direct current adjustment circuit supplies, to the light-emitting element, a bias current within a range less than the threshold current of the light-emitting element in the second state. The bias current has a magnitude corresponding to a magnitude of undershoot occurring at a falling edge of the pulse oscillation.

18 Claims, 9 Drawing Sheets

(56) References Cited

U.S. PATENT DOCUMENTS

| | | | |
|---|---|---|---|
| 2014/0176656 A1 | 6/2014 | Omori et al. | |
| 2015/0036707 A1* | 2/2015 | Fulkerson, Jr. | H01S 5/06808 |
| | | | 372/38.01 |
| 2016/0141833 A1* | 5/2016 | Moto | H01S 5/0428 |
| | | | 372/38.02 |
| 2017/0149207 A1* | 5/2017 | Almonte | H01S 3/1305 |

FOREIGN PATENT DOCUMENTS

| | | |
|---|---|---|
| JP | H10-261827 | 9/1998 |
| JP | 2002-084031 | 3/2002 |
| JP | 2003-324339 | 11/2003 |
| JP | 2005-136155 | 5/2005 |
| JP | 2008-153544 | 7/2008 |
| JP | 2009-032736 | 2/2009 |
| JP | 2009-537060 | 10/2009 |
| JP | 2010-087416 | 4/2010 |
| JP | 2010-287264 | 12/2010 |
| JP | 2012-089564 | 5/2012 |
| JP | 2014-130885 | 7/2014 |

\* cited by examiner

DRIVE CIRCUIT AND LIGHT SOURCE DEVICE

CROSS-REFERENCE TO RELATED APPLICATION

This application claims priority to Japanese Patent Application No. 2021-155191 filed on Sep. 24, 2021, the disclosure of which is hereby incorporated by reference in its entirety.

BACKGROUND

The present disclosure relates to a drive circuit and a light source device.

A drive circuit that drives a light-emitting element is known. The drive circuit is used in, for example, a light source device of a processing apparatus that processes an object with light emitted from a light-emitting element, such as a laser exposure apparatus that exposes a resist with laser light or a laser processing apparatus that processes an object with laser light, such as cutting or welding.

In such a drive circuit, the light-emitting element is subjected to pulse oscillation. When the light-emitting element is pulse-oscillated, the drive circuit repeats emission of light from the light-emitting element and stoppage of the emission of light. At this time, so-called undershoot may occur in which at least one of a voltage applied to the light-emitting element and a current supplied to the light-emitting element is temporarily changed in a reverse direction of the voltage applied and the current supplied to the light-emitting element at a falling edge (at a time of switching from a state of emitting light to a state of stopping the emission of light) of the pulse oscillation. Such undershoot causes degradation of the light-emitting element and a protecting element connected in parallel to the light-emitting element.

Therefore, in the drive circuit and the light source device using the drive circuit, it is desired that the undershoot can be suppressed even when the light-emitting element is pulse-oscillated (see, for example, Japanese Patent Publication No. 2005-136155).

SUMMARY

The present disclosure provides a drive circuit and a light source device that can suppress undershoot even when a light-emitting element is pulse-oscillated.

According to an aspect of the present disclosure, a switching circuit and a direct current adjustment circuit are provided. The switching circuit is configured to switch between a first state and a second state to cause a light-emitting element to perform pulse oscillation. In the first state, light is emitted from the light-emitting element by supplying the light-emitting element with a current having a magnitude equal to or greater than a threshold current that enables the light-emitting element to emit light having an output equal to or greater than a predetermined output. In the second state, the magnitude of the current supplied to the light-emitting element is less than the threshold current. The direct current adjustment circuit is configured to supply, to the light-emitting element, a bias current within a range less than the threshold current of the light-emitting element in the second state. The bias current has a magnitude corresponding to a magnitude of undershoot occurring at a falling edge of the pulse oscillation.

According to an aspect of the present disclosure, there is provided a drive circuit and a light source device that can suppress undershoot even when a light-emitting element is pulse-oscillated.

DESCRIPTIONS

Figure 1:
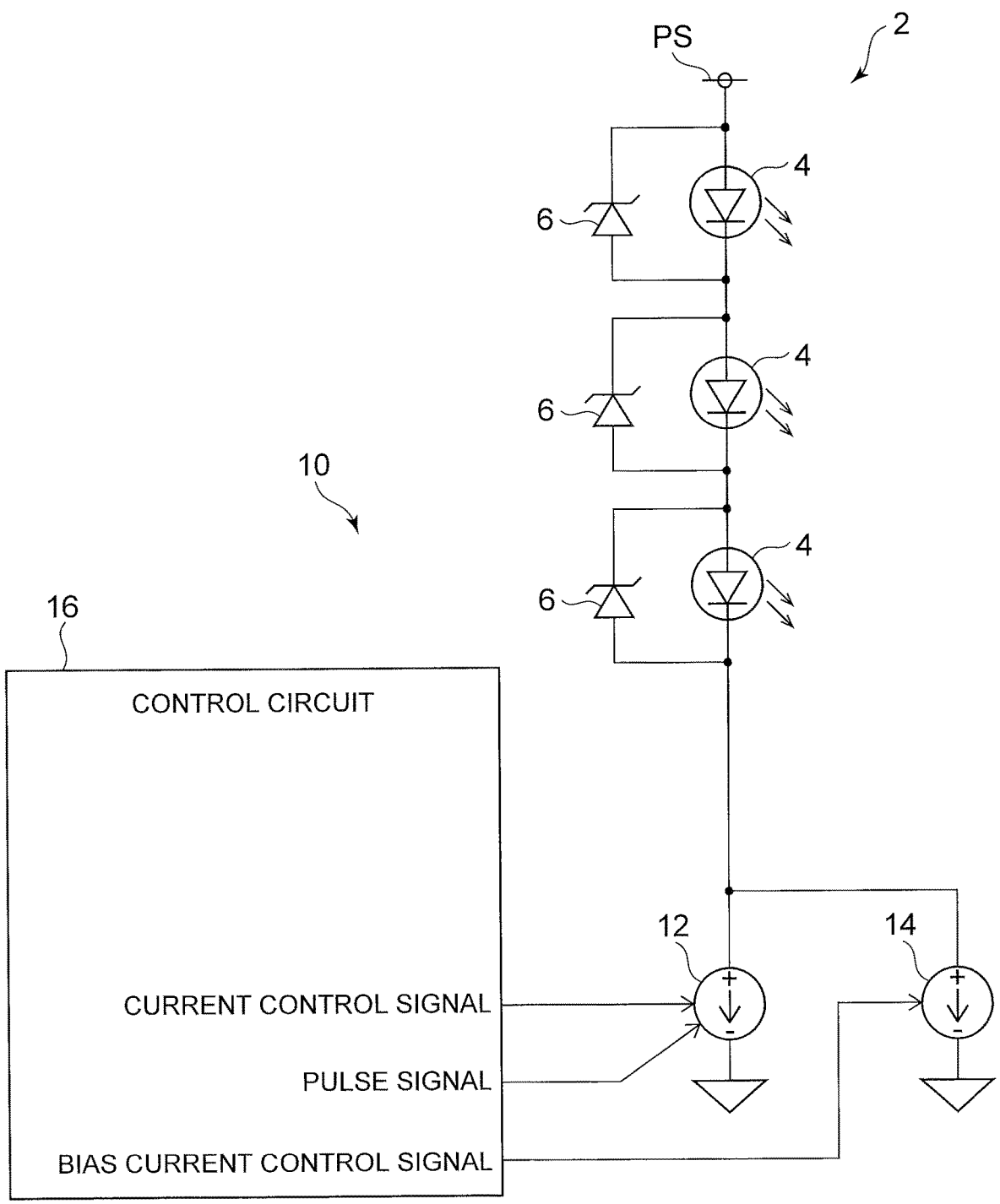
FIG. 1 is a circuit diagram schematically illustrating a drive circuit and a light source device, according to a first embodiment.

Embodiments will be described below with reference to the drawings. Note that, in the drawings, the same elements are given the same reference signs.

First Embodiment

FIG. 1 is a circuit diagram schematically illustrating a drive circuit and a light source device, according to a first embodiment.

As illustrated in FIG. 1, a light source device 2 includes a light-emitting element 4, and a drive circuit 10. The light source device 2 includes, for example, a plurality of light-emitting elements 4 connected in series. In this example, the light source device 2 includes three light-emitting elements 4 connected in series. However, the number of light-emitting elements 4 is not limited to three, and instead can be one, can be two, or four or more. The number of light-emitting elements 4 can be a discretionary number. The light-emitting elements 4 are, for example, laser diodes. However, the light-emitting elements 4 are not limited to laser diodes, and can be another light-emitting elements.

The light source device 2 further includes a protecting element 6, for example. The protecting element 6 is connected in parallel with the light-emitting element 4, for example. In this example, the light source device 2 includes a plurality of protecting elements 6 respectively corresponding to the plurality of light-emitting elements 4. The plurality of protecting elements 6 are connected in parallel respectively to the plurality of light-emitting elements 4.

For example, the protecting element 6 suppresses a reverse voltage from being applied to the light-emitting element 4 or suppresses a reverse current from being supplied to the light-emitting element 4. The protecting element 6 is a Zener diode, for example. In this case, the protecting element 6 can suppress a voltage equal to or greater than a predetermined value to be applied into the forward direction of the light-emitting element 4. However, the protecting element 6 can be, for example, another rectifier element, etc. The protecting element 6 can be a discretionary element that is connected in parallel with the light-emitting element 4 and can protect the light-emitting element 4. Note that the protecting element 6 can be provided in the drive circuit 10, without being limited to the light source device 2. Also, the protecting element 6 is provided as needed, and can be omitted.

The drive circuit 10 is electrically connected to the light-emitting element 4. Note that "electrically connected" can be a state in which two members are directly connected via a wire, etc., or can be a state in which two members are indirectly connected via another conductive member, etc.

The drive circuit 10 drives the light-emitting element 4. In other words, the drive circuit 10 supplies current to the light-emitting element 4. The light-emitting element 4 emits light according to the current from the drive circuit 10. The drive circuit 10 performs switching between emission of light from the light-emitting element 4 and stop of the emission of light, and adjusts the intensity of light emitted from the light-emitting element 4. In this manner, the light source device 2 can emit light having a predetermined pulse from the light-emitting element 4 by driving the light-emitting element 4 with the drive circuit 10.

The light source device 2 is used, for example, for an exposure apparatus or a processing apparatus. The exposure apparatus uses, for example, a semiconductor wafer, etc. as an object to be processed, and exposes a predetermined pattern on a resist applied on the surface of the wafer with light emitted from the light-emitting element 4 through an optical system. The processing apparatus uses, for example, a metal plate or a metal foil as an object to be processed, and performs various kinds of processing such as cutting processing, hole-make processing, and welding processing on the object with light emitted from the light-emitting element 4 through the optical system.

The drive circuit 10 includes a switching circuit 12, a direct current adjustment circuit 14, and a control circuit 16.

The switching circuit 12 performs switching between a first state in which light is emitted from the light-emitting element 4 by supplying a current having a magnitude equal to or greater than the threshold current of the light-emitting element 4 to the light-emitting element 4, and a second state in which the magnitude of the current supplied to the light-emitting element 4 is less than the threshold current. In other words, the first state is an emission state in which light having a predetermined output or more is emitted from the light-emitting element 4. The second state is a state in which the output of the light emitted from the light-emitting element 4 is less than the predetermined output. In other words, the second state is a non-emission state in which the emission of laser light from the light-emitting element 4 is substantially stopped. The second state can be, for example, a state in which the supply of current to the light-emitting element 4 is stopped. The drive circuit 10 causes the light-emitting element 4 to perform pulse oscillation by switching between the first state and the second state by the switching circuit 12.

The threshold current is a current with which light having a predetermined output or more can be emitted from the light-emitting element 4. For example, when the light-emitting element 4 is a laser diode, the threshold current is a current with which the light-emitting element 4 starts laser oscillation.

The light-emitting element 4 of the light source device 2 used in the exposure apparatus or the processing apparatus is a light-emitting element with a relatively high output. The drive circuit 10 is, for example, a drive circuit that drives a light-emitting element 4 with a high output. The magnitude of the current supplied to the light-emitting element 4 in the first state is, for example, 1 A or more. The light-emitting element 4 with a high output is, for example, a light-emitting element with an operating current of 1 A or more. In this case, the threshold current is, for example, approximately hundreds of mA.

The light-emitting element 4 is electrically connected to a direct current power supply PS. The switching circuit 12 is provided between the light-emitting element 4 and a terminal of a common potential. For example, in a case in which the light-emitting element 4 is a laser diode, an anode of the light-emitting element 4 is electrically connected to the direct current power supply PS, and a cathode of the light-emitting element 4 is electrically connected to the switching circuit 12. More specifically, one end (anode) of the plurality of light-emitting elements 4 connected in series is electrically connected to the direct current power supply PS, and the other end (cathode) of the plurality of light-emitting elements 4 connected in series is electrically connected to the switching circuit 12. The common potential is, for example, a ground potential. This allows the first state and the second state to be switched by controlling the current flowing through the switching circuit 12. In other words, the light-emitting element 4 can be pulse-oscillated by the switching circuit 12.

Additionally, the switching circuit 12 adjusts the magnitude of the current supplied to the light-emitting element 4 in the first state. In other words, the switching circuit 12 adjusts the intensity of the light emitted from the light-emitting element 4. For example, in the first state, the switching circuit 12 supplies a current having a substantially constant magnitude to the light-emitting element 4. The switching circuit 12 is, for example, a constant current circuit.

In the second state in which the magnitude of the current supplied to the light-emitting element 4 is less than the threshold current, the direct current adjustment circuit 14 can supply a current (hereinafter referred to as a bias current) having a predetermined magnitude less than the threshold current of the light-emitting element 4 to the light-emitting element 4. For example, the direct current adjustment circuit 14 can supply the bias current to the light-emitting element 4 when the switching circuit 12 is in either state of the first state and the second state. In this case, a current obtained by adding the bias current to the current supplied to the switching circuit 12 side is supplied to the light-emitting element 4. The direct current adjustment circuit 14 can supply the bias current to the light-emitting element 4 only when the switching circuit 12 is in the second state, for example. The direct current adjustment circuit 14 supplies, for example, a bias current having a substantially constant magnitude to the light-emitting element 4. The direct current adjustment circuit 14 is, for example, a constant current circuit.

Note that when the switching circuit 12 is in the second state, the light-emitting element 4 can be in a state of not emitting light or can be in a state of emitting weak light that does not affect the operation of the light source device 2.

The control circuit 16 controls the operation of the switching circuit 12 and the direct current adjustment circuit 14. The control circuit 16 inputs a pulse signal that periodically repeats on and off to the switching circuit 12. The switching circuit 12 performs switching between the first state and the second state according to the pulse signal input from the control circuit 16 to cause the light-emitting element 4 to perform pulse oscillation.

Additionally, the control circuit 16 inputs a current control signal to the switching circuit 12 for controlling the magnitude of the current supplied to the light-emitting element 4. In the first state, the switching circuit 12 supplies to the light-emitting element 4, a current having a magnitude corresponding to the current control signal input from the control circuit 16. For example, in the first state, the switching circuit 12 supplies to the light-emitting element 4, a current having a substantially constant magnitude corresponding to the current control signal.

The control circuit 16 changes the magnitude of the current control signal input to the switching circuit 12 according to, for example, the type of object or the type of processing to be applied to the object. As a result, for example, energy applied to the object can be easily adjusted. Further, the control circuit 16 changes the duty ratio of the pulse signal input to the switching circuit 12 according to, for example, the type of object or the type of processing to be applied to the object. As a result, for example, energy applied to the object can be more easily adjusted. In this manner, the control circuit 16 controls the operation of the switching circuit 12 by inputting the pulse signal and the current control signal into the switching circuit 12.

The control circuit 16 inputs a bias current control signal to the direct current adjustment circuit 14 for controlling the magnitude of the bias current supplied to the light-emitting element 4. The direct current adjustment circuit 14 supplies to the light-emitting element 4, a bias current having a magnitude corresponding to the bias current control signal input from the control circuit 16. For example, the direct current adjustment circuit 14 supplies to the light-emitting element 4, a bias current having a substantially constant magnitude corresponding to the bias current control signal. In this manner, the control circuit 16 controls the operation of the direct current adjustment circuit 14 by inputting the bias current control signal to the direct current adjustment circuit 14.

For example, when the magnitude of the current to be supplied to the light-emitting element 4 is determined in advance or the like, the current control signal may not be necessarily input from the control circuit 16 to the switching circuit 12. The signal input from the control circuit 16 to the switching circuit 12 can be a pulse signal only. Similarly, when the magnitude of the bias current to be supplied to the light-emitting element 4 is determined in advance or the like, the bias current control signal may not be necessarily input from the control circuit 16 to the direct current adjustment circuit 14.

In this example, the control circuit 16 is illustrated as a signal source that inputs the pulse signal for causing the light-emitting element 4 to perform pulse oscillation to the switching circuit 12. The signal source is not limited to the control circuit 16, and can be a discretionary signal source that can input the pulse signal into the switching circuit 12. For example, a dedicated oscillator circuit can be used as a signal source.

For example, the switching circuit 12 and the direct current adjustment circuit 14 can be operated on the basis of a control signal input from the outside via the Micro Control Unit (MCU) or the network, etc. In other words, the drive circuit 10 can drive the light-emitting element 4 based on the control signal input from an external device. In this case, the control circuit 16 can be omitted. The control circuit 16 can be provided in the light source device 2 without being limited to the drive circuit 10.

Figure 2:
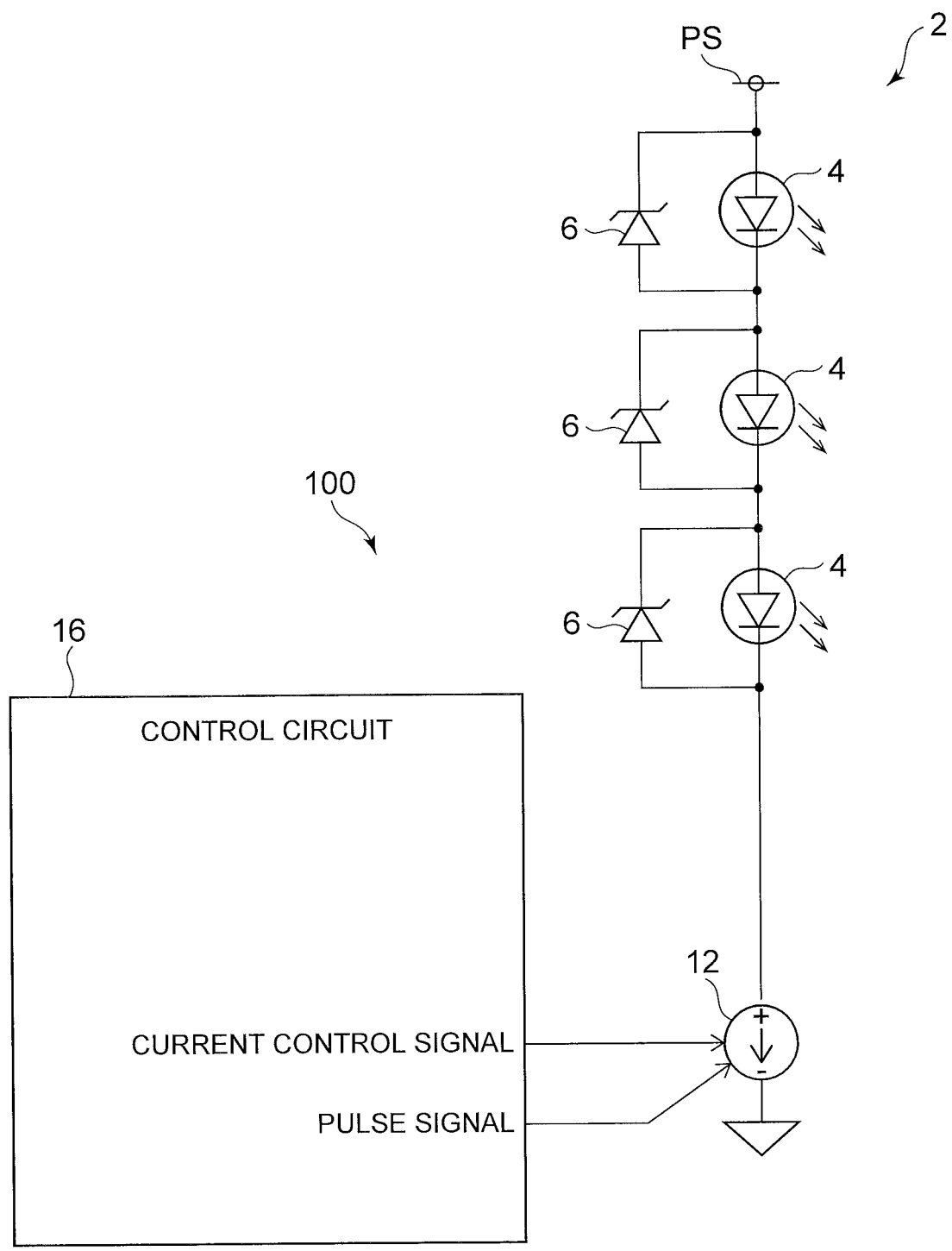
FIG. 2 is a circuit diagram schematically illustrating a reference drive circuit.

FIG. 2 is a circuit diagram schematically illustrating a reference drive circuit. As illustrated in FIG. 2, in a reference drive circuit 100, the direct current adjustment circuit 14 is omitted. In the reference drive circuit 100 illustrated in FIG. 2, components having substantially the same functions and configurations as those of the light source device 2 and the drive circuit 10 are denoted by the same reference numerals, and detailed description thereof will be omitted. The reference drive circuit 100 is substantially the same as the drive circuit 10 except that the direct current adjustment circuit 14 is omitted.

Figure 3A:
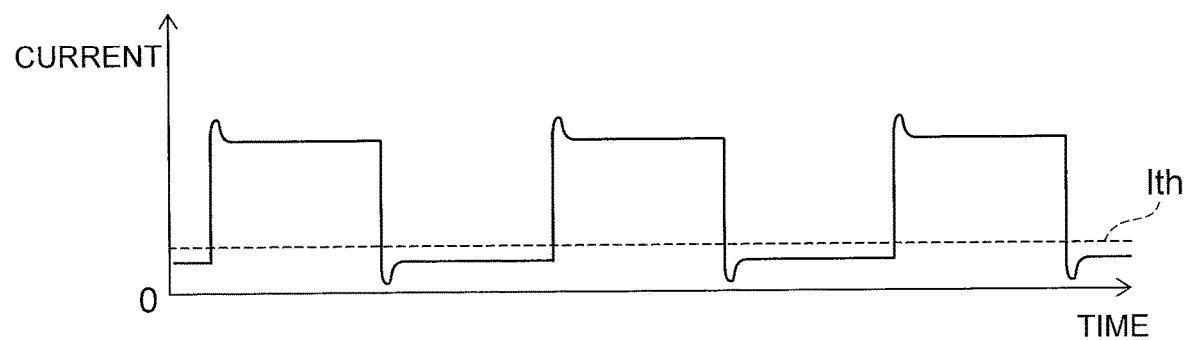
FIGS. 3A and 3B are graphs schematically showing an example of operation of the drive circuit.
Figure 3B:
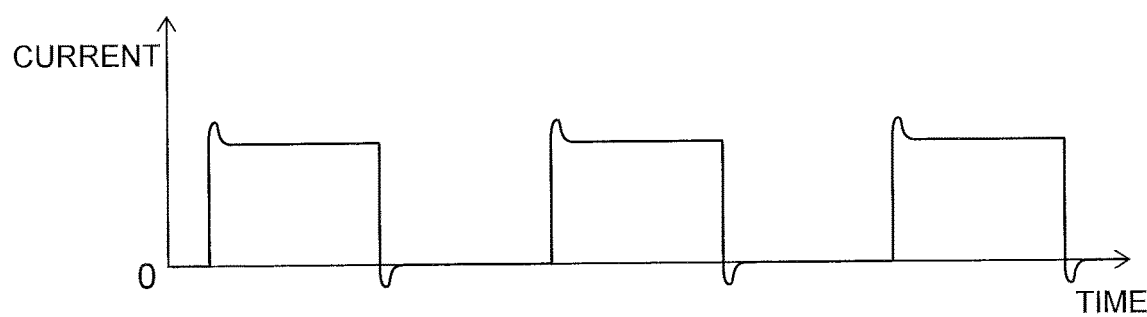

FIGS. 3A and 3B are graphs schematically showing an example of operation of the drive circuit.

FIG. 3A is a graph schematically showing an example of a waveform of a current supplied to the light-emitting element 4 in the drive circuit 10 according to the embodiment.

FIG. 3B is a graph schematically showing an example of a waveform of a current supplied to the light-emitting element 4 in the reference drive circuit 100 in which the direct current adjustment circuit 14 is omitted.

As illustrated in FIGS. 3A and 3B, in the drive circuit 10 and the reference drive circuit 100, when the light-emitting element 4 is pulse-oscillated by the switching circuit 12, at least one of the voltage applied to the light-emitting element 4 and the current supplied to the light-emitting element 4 can temporarily fall below the reference level in the second state at the falling edge (when the switching circuit 12 is switched from the first state to the second state) of the pulse oscillation, that is, so-called undershoot can occur.

In this case, as illustrated in FIG. 3B, in the reference drive circuit 100 in which the direct current adjustment circuit 14 is not provided, the reference level of the voltage applied to the light-emitting element 4 and the current supplied to the light-emitting element 4 in the second state is substantially the level of the common potential (for example, the ground level). Therefore, due to the occurrence of the undershoot, at least one of the voltage applied to the light-emitting element 4 and the current supplied to the light-emitting element 4 temporarily changes in the reverse direction (negative side) of the light-emitting element 4.

Such a change in voltage or current into the reverse direction of the light-emitting element 4 due to the undershoot causes degradation of the light-emitting element 4, the protecting element 6 connected in parallel to the light-emitting element 4, etc.

For example, in a case in which the protecting element 6 is provided, a relatively large forward current is supplied to the protecting element 6, and can degrade the protecting element 6. When the protecting element 6 is not provided, a voltage in the reverse direction of the light-emitting element 4 is applied to the light-emitting element 4, and can degrade the light-emitting element 4.

In contrast, the drive circuit 10 according to the present embodiment includes the direct current adjustment circuit 14 that can supply to the light-emitting element 4, the bias current having a predetermined magnitude less than the threshold current of the light-emitting element 4 when the switching circuit 12 is in the second state in which the magnitude of the current supplied to the light-emitting element 4 is less than the threshold current (for example, the threshold current Ith illustrated in FIG. 3A) of the light-emitting element 4. Accordingly, in the drive circuit 10 according to the present embodiment, as illustrated in FIG. 3A, the current supplied to the light-emitting element 4 can be shifted to the forward direction side (positive side) of the light-emitting element 4 entirely by the bias current. Thus, even when the undershoot occurs, at least one of the voltage applied to the light-emitting element 4 and the current supplied to the light-emitting element 4 can be suppressed from temporarily changing into the reverse direction of the light-emitting element 4 at the falling edge of the pulse oscillation.

As illustrated in FIG. 3A, the magnitude of the bias current is set according to the magnitude of the undershoot that occurs at the falling edge of the pulse oscillation. For example, when the switching circuit 12 is in the second state in which the magnitude of the current supplied to the light-emitting element 4 is less than the threshold current, the direct current adjustment circuit 14 can supply the light-emitting element 4 with a bias current having a magnitude corresponding to the magnitude of the undershoot generated at the falling edge of the pulse oscillation within a range less than the threshold current of the light-emitting element 4.

The magnitude of the undershoot is, for example, a magnitude by which the current supplied to the light-emitting element 4 becomes lower at the falling edge of the pulse oscillation than the magnitude when only the bias current is supplied.

For example, the magnitude of the bias current is set such that the current supplied to the light-emitting element 4 when the switching circuit 12 is in the second state is greater than the magnitude of the undershoot by a predetermined amount within a range less than the threshold current of the light-emitting element 4. The predetermined amount is set to, for example, one tenth or less of the threshold current. In other words, the magnitude of the bias current is set such that the current supplied to the light-emitting element 4 when the switching circuit 12 is in the second state is slightly greater than the magnitude of the undershoot by a predetermined amount within a range less than the threshold current of the light-emitting element 4. Accordingly, an increase in power consumption due to the supply of the bias current can be suppressed while appropriately suppressing the change in voltage and current into the reverse direction of the light-emitting element 4 at the falling edge of the pulse oscillation of the voltage applied to the light-emitting element 4 and the current supplied to the light-emitting element 4.

For example, the magnitude of the bias current can be set such that the current supplied to the light-emitting element 4 when the switching circuit 12 is in the second state is less than the threshold current of the light-emitting element 4 by a predetermined amount. In other words, the magnitude of the bias current can be set such that the current supplied to the light-emitting element 4 when the switching circuit 12 is in the second state is slightly less than the threshold current of the light-emitting element 4. In this case, even when the large unintentional undershoot occurs, the change of the voltage applied to the light-emitting element 4 and the current supplied to the light-emitting element 4 to the negative side at the falling edge of the pulse oscillation can be appropriately suppressed. The degradation of the light-emitting element 4 and the protecting element 6 can be more appropriately suppressed.

Figure 4:
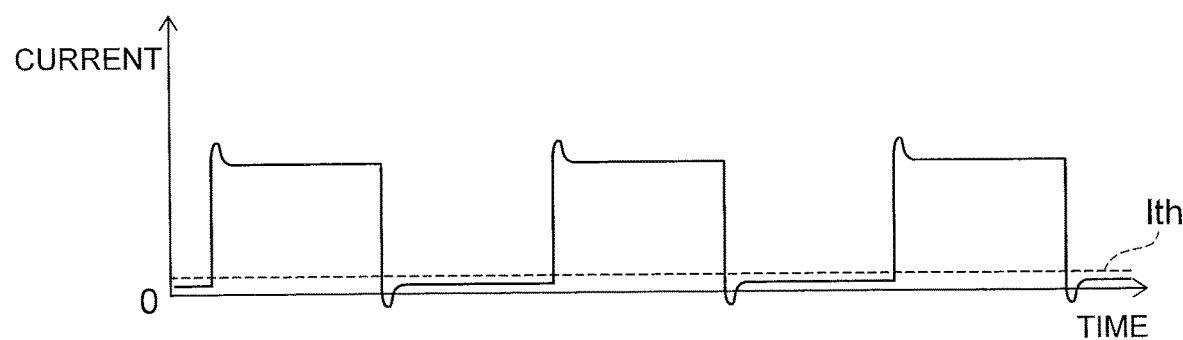
FIG. 4 is a graph schematically showing another example of a waveform of a current supplied to a light-emitting element in the drive circuit, according to the embodiment.

FIG. 4 is a graph schematically showing another example of a waveform of a current supplied to a light-emitting element in the drive circuit according to the embodiment. As illustrated in FIG. 4, the magnitude of the bias current may not necessarily be greater than the magnitude of the undershoot. For example, when the magnitude of the undershoot is greater than the threshold current of the light-emitting element 4, the magnitude of the bias current can be set such that the current supplied to the light-emitting element 4 when the switching circuit 12 is in the second state is less than the threshold current of the light-emitting element 4 by a predetermined amount. In this case as well, at least one of the voltage applied to the light-emitting element 4 and the current supplied to the light-emitting element 4 can be suppressed from temporarily changing into the reverse direction of the light-emitting element 4 at the falling edge of the pulse oscillation, as compared with the case in which the direct current adjustment circuit 14 is not provided. As compared with the case in which the direct current adjustment circuit 14 is not provided (the case of FIG. 3B), the change in at least one of the voltage applied to the light-emitting element 4 and the current supplied to the light-emitting element 4 into the reverse direction of the light-emitting element 4 can be reduced.

In this manner, the drive circuit 10 and the light source device 2 using the drive circuit 10, according to the present embodiment, include the direct current adjustment circuit 14 that can supply the bias current having the magnitude corresponding to the magnitude of the undershoot generated at the falling edge of the pulse oscillation to the light-emitting element 4 within the range less than the threshold current of the light-emitting element 4 when the switching circuit 12 is in the second state in which the magnitude of the current supplied to the light-emitting element 4 is less than the threshold current. Accordingly, in the drive circuit 10 and the light source device 2, also when the light-emitting element 4 is caused to perform pulse oscillation, the change in voltage and current into the reverse direction of the light-emitting element 4 can be suppressed at the falling edge of the pulse oscillation of the voltage applied to the light-emitting element 4 and the current supplied to the light-emitting element 4. Accordingly, in the drive circuit 10 and the light source device 2, according to the present embodiment, degradation of the light-emitting element 4 and the protecting element 6 can be suppressed, and the life of the light-emitting element 4 and the protecting element 6 can be increased. For example, a decrease in light output with respect to an injection current of the light-emitting element 4 and an open failure of the protecting element 6, etc. can be suppressed. Therefore, the durability of the light source device 2 can be improved.

Figure 5:
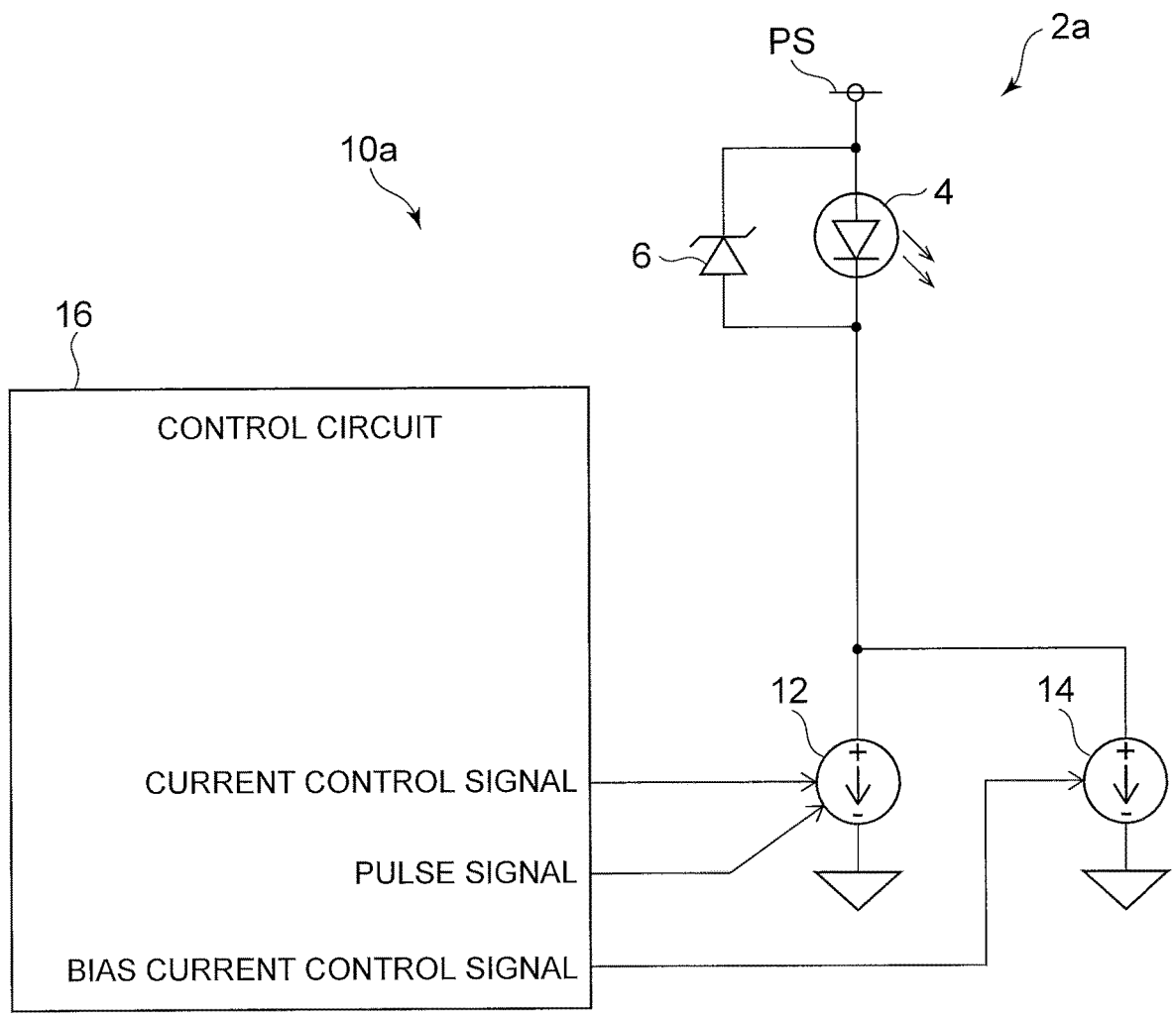
FIG. 5 is a circuit diagram schematically illustrating a modification example of the drive circuit and the light source device, according to the first embodiment.

FIG. 5 is a circuit diagram schematically illustrating a modification example of the drive circuit and the light source device, according to the first embodiment. Note that components having substantially the same functions and configurations as those of the above-described embodiment are denoted by the same reference numerals, and detailed description thereof will be omitted.

As illustrated in FIG. 5, in a light source device 2a and a drive circuit 10a, the light source device 2a includes one light-emitting element 4 and one protecting element 6 connected in parallel to the one light-emitting element 4. In this manner, the number of light-emitting elements 4 can be one. The number of light-emitting elements 4 can be a discretionary number. When the plurality of light-emitting elements 4 are provided, the protecting element 6 can respectively correspond to the plurality of light-emitting elements 4. The number of protecting elements 6 is, for example, the same as the number of light-emitting elements 4.

Figure 6:
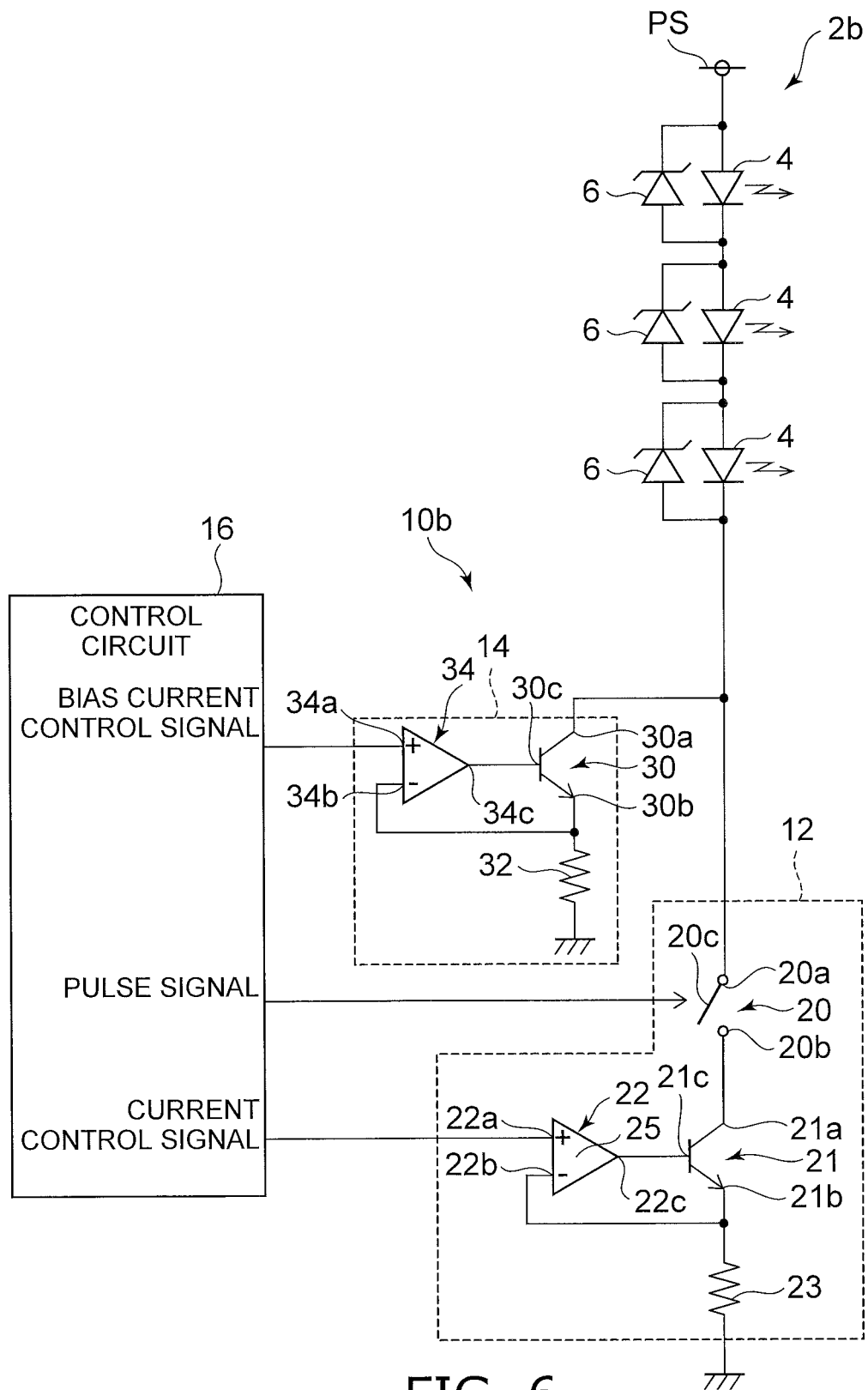
FIG. 6 is a circuit diagram schematically illustrating the modification example of the drive circuit and the light source device, according to the first embodiment.

FIG. 6 is a circuit diagram schematically illustrating the modification example of the drive circuit and the light source device, according to the first embodiment. As illustrated in FIG. 6, in the light source device 2b and the drive circuit 10b, the switching circuit 12 includes switching elements 20, 21, a differential amplifier circuit 22, and a resistive element 23.

The switching element 20 performs switching between the first state and the second state. The switching element 21 adjusts the magnitude of the current supplied to the light-emitting element 4. The switching element 20 includes a pair of main terminals 20a, 20b, and a control terminal 20c. The control terminal 20c controls switching between the on state and the off state of the current supplied between the main terminal 20a and the main terminal 20b. The switching element 21 includes a pair of main terminals 21a, 21b, and a control terminal 21c. The control terminal 21c controls the magnitude of the current supplied between the main terminal 21a and the main terminal 21b.

A bipolar transistor, an FET, etc. is used for the switching elements 20, 21, for example. However, the switching elements 20, 21 are not limited thereto. The switching element 20 can be a discretionary switching element that can switch between the first state in which light is emitted from the light-emitting element 4 and the second state in which the magnitude of the current supplied to the light-emitting element 4 is less than the threshold current. The switching element 21 can be a discretionary switching element that can adjust the magnitude of the current supplied to the light-emitting element 4.

The main terminal 20a of the switching element 20 is electrically connected to the light-emitting element 4. The main terminal 20a is electrically connected to one end (cathode) of the plurality of light-emitting elements 4 connected in series, for example. The main terminal 20b of the switching element 20 is electrically connected to the main terminal 21a of the switching element 21. The main terminal 21b of the switching element 21 is electrically connected to one end of the resistive element 23. The other end of the resistive element 23 is electrically connected to the terminal of the common potential.

Thus, by turning on the switching element 20, a current is supplied to the light-emitting element 4, and light is emitted from the light-emitting element 4. That is, when the switching element 20 is turned on and a current having a magnitude equal to or greater than the threshold current is supplied to the light-emitting element 4, the first state is established in which light is emitted from the light-emitting element 4.

Then, by turning off the switching element 20, the emission of the light from the light-emitting element 4 is stopped. By turning off the switching element 20, the second state is established in which the magnitude of the current supplied to the light-emitting element 4 is less than the threshold current. In this manner, the drive circuit 10b causes the light-emitting element 4 to perform pulse oscillation by switching between the on state and the off state of the switching element 20.

The switching element 20 switches the on state and the off state according to the magnitude of the voltage applied to the control terminal 20c or the magnitude of the current flowing through the control terminal 20c. The control terminal 20c is electrically connected to the control circuit 16. The on state and the off state of the switching element 20 are switched based on control of the control circuit 16.

The switching element 21 adjusts the magnitude of the current supplied between the main terminal 21a and the main terminal 21b according to the magnitude of the voltage applied to the control terminal 21c or the magnitude of the current flowing through the control terminal 21c. Thus, the switching element 21 adjusts the magnitude of the current supplied to the light-emitting element 4 according to the magnitude of the voltage applied to the control terminal 21c or the magnitude of the current flowing through the control terminal 21c.

The drive circuit 10b adjusts the magnitude of the current supplied to the light-emitting element 4 by adjusting the magnitude of the voltage applied to the control terminal 21c of the switching element 21 or the magnitude of the current flowing through the control terminal 21c. In other words, the drive circuit 10b adjusts the intensity of the light emitted from the light-emitting element 4 by adjusting the magnitude of the voltage applied to the control terminal 21c of the switching element 21 or the magnitude of the current flowing through the control terminal 21c. For example, the drive circuit 10b adjusts the magnitude of the voltage applied to the control terminal 21c or the magnitude of the current flowing through the control terminal 21c such that a current having a substantially constant magnitude is supplied to the light-emitting element 4. The switching circuit 12 is, for example, a constant current circuit.

The differential amplifier circuit 22 includes a first input terminal 22a, a second input terminal 22b, and an output terminal 22c. The output terminal 22c is electrically connected to the control terminal 21c of the switching element 21. A reference signal serving as a reference for emitting light of a desired intensity from the light-emitting element 4 is input to the first input terminal 22a. A detection signal corresponding to the detection result of the current supplied to the light-emitting element 4 is input to the second input terminal 22b. In other words, the detection signal is a feedback signal that feeds back the detection result of the current supplied to the light-emitting element 4 to the differential amplifier circuit 22.

The differential amplifier circuit 22 controls the current supplied to the switching element 21 based on the voltage of the first input terminal 22a and the voltage of the second input terminal 22b. The differential amplifier circuit 22 applies a voltage corresponding to the difference between the reference signal and the detection signal to the control terminal 21c of the switching element 21. Thus, the differential amplifier circuit 22 causes a current having a substantially constant magnitude corresponding to the reference signal to be supplied to the light-emitting element 4.

For example, the detection signal is set to have the same value as the value of the reference signal when a desired current corresponding to the reference signal is supplied to the light-emitting element 4. The differential amplifier circuit 22 causes a current having a substantially constant magnitude to be supplied to the light-emitting element 4 by applying a voltage from the output terminal 22c to the control terminal 21c.

When the current supplied to the light-emitting element 4 becomes greater than the desired current corresponding to the reference signal, the detection signal becomes great, and the difference from the reference signal becomes less than the predetermined amount. Therefore, control is performed so that the voltage applied to the control terminal 21c decreases and the current supplied to the switching elements 21 and the light-emitting elements 4 decreases. On the other hand, when the current supplied to the light-emitting element 4 becomes less than the desired current corresponding to the reference signal, the detection signal becomes less and the difference from the reference signal becomes greater than the predetermined amount. Therefore, control is performed so that the voltage applied to the control terminal 21c increases and the current supplied to the switching elements 21 and the light-emitting elements 4 increases. This makes it possible to control the current supplied to the light-emitting element 4 to be close to a value corresponding to the reference signal and to have a substantially constant magnitude.

The differential amplifier circuit 22 includes, for example, an operational amplifier 25. The first input terminal 22a is, for example, a non-inverting input terminal of the operational amplifier 25. The second input terminal 22b is, for example, an inverting input terminal of the operational amplifier 25. The differential amplifier circuit 22 is not limited to the configuration including the operational amplifier 25, and can be, for example, configured to have the same function by combining a plurality of transistors. The circuit for causing a current having a substantially constant magnitude to flow through the light-emitting element 4 is not limited to the differential amplifier circuit 22, and can be a discretionary circuit that can cause a current having a substantially constant magnitude to flow through the light-emitting element 4.

The first input terminal 22a is electrically connected to the control circuit 16. The reference signal is input from the control circuit 16. The control circuit 16 inputs the current control signal as a reference signal to the first input terminal 22a. The control circuit 16 inputs the current control signal having a predetermined magnitude as a reference signal to the first input terminal 22a so that light having an appropriate intensity is emitted from the light-emitting element 4 according to, for example, the type of an object or the type of processing performed on the object. In addition, the control circuit 16 can reduce the voltage applied to the control terminal 21c by reducing the current control signal (reference signal) (for example, to 0 V) to turn off the switching element 21. That is, the light-emitting element 4 can be maintained in an unlit state.

A voltage corresponding to the current supplied to the switching element 21 is generated at both ends of the resistive element 23. A current corresponding to a magnitude obtained by subtracting the bias current flowing through the direct current adjustment circuit 14 from the current supplied to the light-emitting element 4 flows through the switching elements 20, 21 and the resistive element 23. Therefore, by the magnitude of the voltage at both ends of the resistive element 23, the magnitude obtained by subtracting the bias current flowing through the direct current adjustment circuit 14 from the current supplied to the light-emitting element 4 can be detected. In other words, the resistive element 23 is a resistance for detecting the magnitude of the current supplied to the light-emitting element 4.

One end of the resistive element 23 is electrically connected to the main terminal 21b of the switching element 21, and is electrically connected to the second input terminal 22b of the differential amplifier circuit 22. Thus, the voltage generated at both ends of the resistive element 23 is input to the second input terminal 22b as the detection signal. However, the method of inputting the detection signal to the second input terminal 22b is not limited to the above, and a discretionary method can be used.

The control circuit 16 inputs a pulse signal that is periodically turned on and off to the control terminal 20c of the switching element 20. When the pulse signal is on (high), the voltage value of the pulse signal is sufficiently higher than the voltage value of the threshold value of the switching element 20. Therefore, when the pulse signal is on, the switching element 20 is turned on, and as described above, the current supplied to the light-emitting element 4 is controlled based on the reference signal (current control signal) and the detection signal. Thus, when the pulse signal is on, light is emitted from the light-emitting element 4.

On the other hand, when the pulse signal is off (low), the voltage value of the pulse signal is lower than the voltage value of the threshold value of the switching element 20. That is, when the pulse signal is off, the switching element 20 is turned off, and emission of light from the light-emitting element 4 is stopped.

In this manner, the control circuit 16 inputs the current control signal to the first input terminal 22a of the differential amplifier circuit 22 and inputs the pulse signal to the control terminal 20c of the switching element 20, thereby causing the light-emitting element 4 to perform pulse oscillation.

The control circuit 16 changes the duty ratio of the pulse signal input to the control terminal 20c of the switching element 20 according to, for example, the type of object or the type of processing to be applied to the object. As a result, for example, energy applied to the object can be more easily adjusted.

Additionally, in this example, the control circuit 16 is illustrated as a signal source that inputs the pulse signal for pulse oscillation of the light-emitting element 4 to the control terminal 20c of the switching element 20. The signal source is not limited to the control circuit 16, and can be a discretionary signal source that can input the pulse signal into the control terminal 20c of the switching element 20. For example, a dedicated oscillator circuit can be used as a signal source.

For example, when the magnitude of the current supplied to the light-emitting element 4 is determined in advance, the reference signal is not limited to being input from the control circuit 16 to the first input terminal 22a of the differential amplifier circuit 22, and a voltage having a predetermined magnitude can be input as the reference signal to the first input terminal 22a of the differential amplifier circuit 22.

The arrangement order of the switching element 20, the switching element 21, and the resistive element 23 is not limited to the above. In the above, the switching element 21 and the resistive element 23 are provided on the downstream side of the switching element 20. Conversely, the switching element 20 can be provided on the downstream side of the switching element 21 and the resistive element 23. In this case, the voltage generated at both ends of the resistive element 23 is input to the second input terminal 22b of the differential amplifier circuit 22.

The configuration of the switching element 20 can be a discretionary configuration that can switch between the first state in which light is emitted from the light-emitting element 4 and the second state in which the magnitude of the current supplied to the light-emitting element 4 is less than the threshold current. The configuration of the switching element 21 can be a discretionary configuration that can adjust the magnitude of the current supplied to the light-emitting element 4. The configuration of the switching circuit 12 is not limited to the above, and can be a discretionary configuration that can switch between the first state and the second state to cause the light-emitting element 4 to perform pulse oscillation.

Additionally, as illustrated in FIG. 6, in the drive circuit 10b, the direct current adjustment circuit 14 includes a transistor 30, a resistive element 32, and a differential amplifier circuit 34.

The transistor 30 includes a pair of main terminals 30a, 30b, and a control terminal 30c. The main terminal 30a is electrically connected between the light-emitting element 4 and the switching circuit 12. The main terminal 30b of the transistor 30 is electrically connected to one end of the resistive element 32. The other end of the resistive element 32 is electrically connected to the terminal of the common potential.

The control terminal 30c controls the magnitude of the current supplied between the main terminal 30a and the main terminal 30b. The transistor 30 adjusts the magnitude of the current supplied between the main terminal 30a and the main terminal 30b according to the magnitude of the voltage applied to the control terminal 30c or the magnitude of the current flowing through the control terminal 30c. Thus, the transistor 30 adjusts the magnitude of the bias current according to the magnitude of the voltage applied to the control terminal 30e or the magnitude of the current flowing through the control terminal 30c. The direct current adjustment circuit 14 and the control circuit 16 adjust the magnitude of the bias current by adjusting the magnitude of the voltage applied to the control terminal 30c of the transistor 30 or the magnitude of the current flowing to the control terminal 30c.

A bipolar transistor, an FET, etc. is used for the transistor 30, for example. However, the transistor 30 is not limited thereto. The transistor 30 can be a discretionary transistor that can adjust the magnitude of the current supplied between the pair of main terminals 30a, 30b.

The differential amplifier circuit 34 includes a first input terminal 34a, a second input terminal 34b, and an output terminal 34c. The output terminal 34c is electrically connected to the control terminal 30c of the transistor 30. The reference signal that is a reference to the magnitude of the bias current is input to the first input terminal 34a. The detection signal corresponding to the detection result of the bias current is input to the second input terminal 34b. In other words, the detection signal is a feedback signal that feeds back the detection result of the bias current to the differential amplifier circuit 34.

The differential amplifier circuit 34 controls the current supplied to the transistor 30 based on the voltage of the first input terminal 34a and the voltage of the second input terminal 34b. The differential amplifier circuit 34 applies a voltage corresponding to the difference between the reference signal and the detection signal to the control terminal 30c of the transistor 30. Thus, the differential amplifier circuit 34 causes the bias current having a substantially constant magnitude corresponding to the reference signal to be supplied to the transistor 30. For example, the direct current adjustment circuit 14 adjusts the magnitude of the voltage applied to the control terminal 30c such that a bias current having a substantially constant magnitude is supplied. The direct current adjustment circuit 14 is, for example, a constant current circuit. The configuration of the differential amplifier circuit 34 is similar to the configuration of the differential amplifier circuit 22, and thus the detailed description thereof will be omitted. The differential amplifier circuit 34 can be configured with an operational amplifier, or can be, for example, configured by combining a plurality of transistors, similarly to the differential amplifier circuit 22.

The first input terminal 34a is electrically connected to the control circuit 16. The reference signal is input from the control circuit 16, for example. The control circuit 16 inputs the bias current control signal as a reference signal to the first input terminal 34a. The second input terminal 34b is electrically connected to one end of the main terminal 30b and the resistive element 32 of the transistor 30. A voltage corresponding to the bias current occurs at both ends of the resistive element 32. Accordingly, the magnitude of the bias current can be detected by the magnitude of the voltage at both ends of the resistive element 32. In other words, the resistive element 32 is a resistance for detecting the magnitude of the bias current. Thus, the voltage generated at both ends of the resistive element 32 is input to the second input terminal 34b as the detection signal. Thus, the direct current adjustment circuit 14 can supply a bias current having a substantially constant magnitude based on the reference signal and the detection signal.

In this example, the direct current adjustment circuit 14 is electrically connected between the light-emitting element 4 and the switching circuit 12. Thus, the direct current adjustment circuit 14 can supply a current to the light-emitting element 4 even when the switching circuit 12 is in the second state, by applying a voltage having a predetermined magnitude to the control terminal 30c of the transistor 30.

As a result, in the direct current adjustment circuit 14, when the switching circuit 12 is in the second state in which the magnitude of the current supplied to the light-emitting element 4 is less than the threshold current, the bias current having a predetermined magnitude less than the threshold current can be supplied to the light-emitting element 4. The direct current adjustment circuit 14 can supply a bias current having a predetermined magnitude less than the threshold current to the light-emitting element 4 in a state where the switching circuit 12 substantially stops the supply of current to the light-emitting element 4.

The configuration of the direct current adjustment circuit 14 is not limited to the above. For example, when the magnitude of the bias current is determined in advance, the reference signal is not limited to being input from the control circuit 16 to the first input terminal 34a of the differential amplifier circuit 34, and a voltage having a predetermined magnitude can be input as the reference signal to the first input terminal 34a of the differential amplifier circuit 34.

The configuration of the direct current adjustment circuit 14 can be a discretionary configuration that can supply a bias current less than the threshold current of the light-emitting element 4 to the light-emitting element 4 when the switching circuit 12 is in the second state in which the magnitude of the current supplied to the light-emitting element 4 is less than the threshold current. Without being limited to the differential amplifier circuit 34, the circuit that controls the current supplied to the transistor 30 can be a discretionary circuit that can appropriately control the current supplied to the transistor 30 such that the bias current having a magnitude corresponding to the reference signal (bias current control signal) is supplied to the light-emitting element 4.

The direct current adjustment circuit 14 can be configured to adjust the magnitude of the bias current. For example, the resistive element 32 can be a variable resistor, and the magnitude of the bias current can be adjusted by adjusting the resistance value of the resistive element 32.

Alternatively, the magnitude of the bias current can be adjusted by inputting a control signal to the control circuit 16 and causing the control circuit 16 to adjust the magnitude of the voltage of the reference signal (bias current control signal) based on the input control signal. The control signal can be input to the control circuit 16 in response to a manual operation of an operation unit connected to the control circuit 16, and can be input to the control circuit 16 from an external device by configuring the control circuit 16 to be communicable with the external device.

Figure 7:
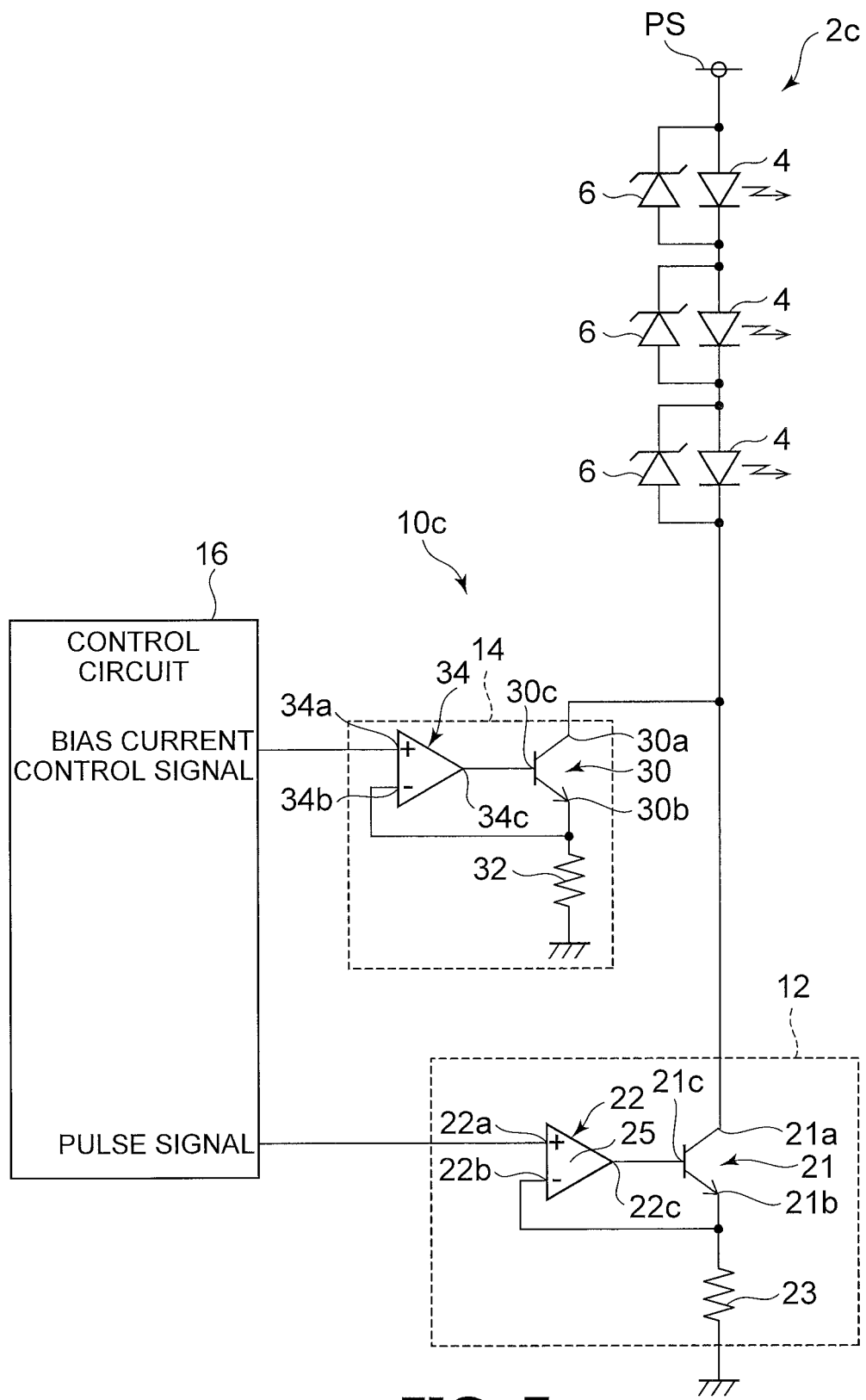
FIG. 7 is a circuit diagram schematically illustrating the modification example of the drive circuit and the light source device, according to the first embodiment.

FIG. 7 is a circuit diagram schematically illustrating the modification example of the drive circuit and the light source device, according to the first embodiment. As illustrated in FIG. 7, in a light source device 2c and a drive circuit 10c, the switching element 20 is omitted in the switching circuit 12 compared to the drive circuit 10b illustrated in FIG. 6.

In the drive circuit 10c, the control circuit 16 inputs the pulse signal as a reference signal to the first input terminal 22a of the differential amplifier circuit 22. In a case in which the pulse signal is on (high), the voltage value of the pulse signal (reference signal) is set to a predetermined magnitude that causes the light-emitting element 4 to emit light having an appropriate intensity according to, for example, the type of an object or the type of processing performed on the object. Thus, when the pulse signal is on, the switching circuit 12 can be set into the first state.

On the other hand, when the pulse signal is off (low), the voltage value of the pulse signal (reference signal) is set to, for example, a predetermined magnitude that makes the magnitude of the current supplied to the light-emitting element 4 less than the threshold current. Thus, when the pulse signal is off, the switching circuit 12 can be set into the second state.

In this manner, the control circuit 16 controls switching between the first state and the second state of the switching circuit 12 by inputting the pulse signal as a reference signal to the first input terminal 22a of the differential amplifier circuit 22.

In this manner, the first state and the second state of the switching circuit 12 can be switched by switching of the switching circuit 12, or can be switched by changing the setting of the current value. The configuration of the switching circuit 12 can be a discretionary configuration that can perform switching between the first state and the second state. An aspect of the control of switching of the first state and the second state of the switching circuit 12 by the control circuit 16 can be a discretionary aspect depending on the configuration of the switching circuit 12.

Figure 8:
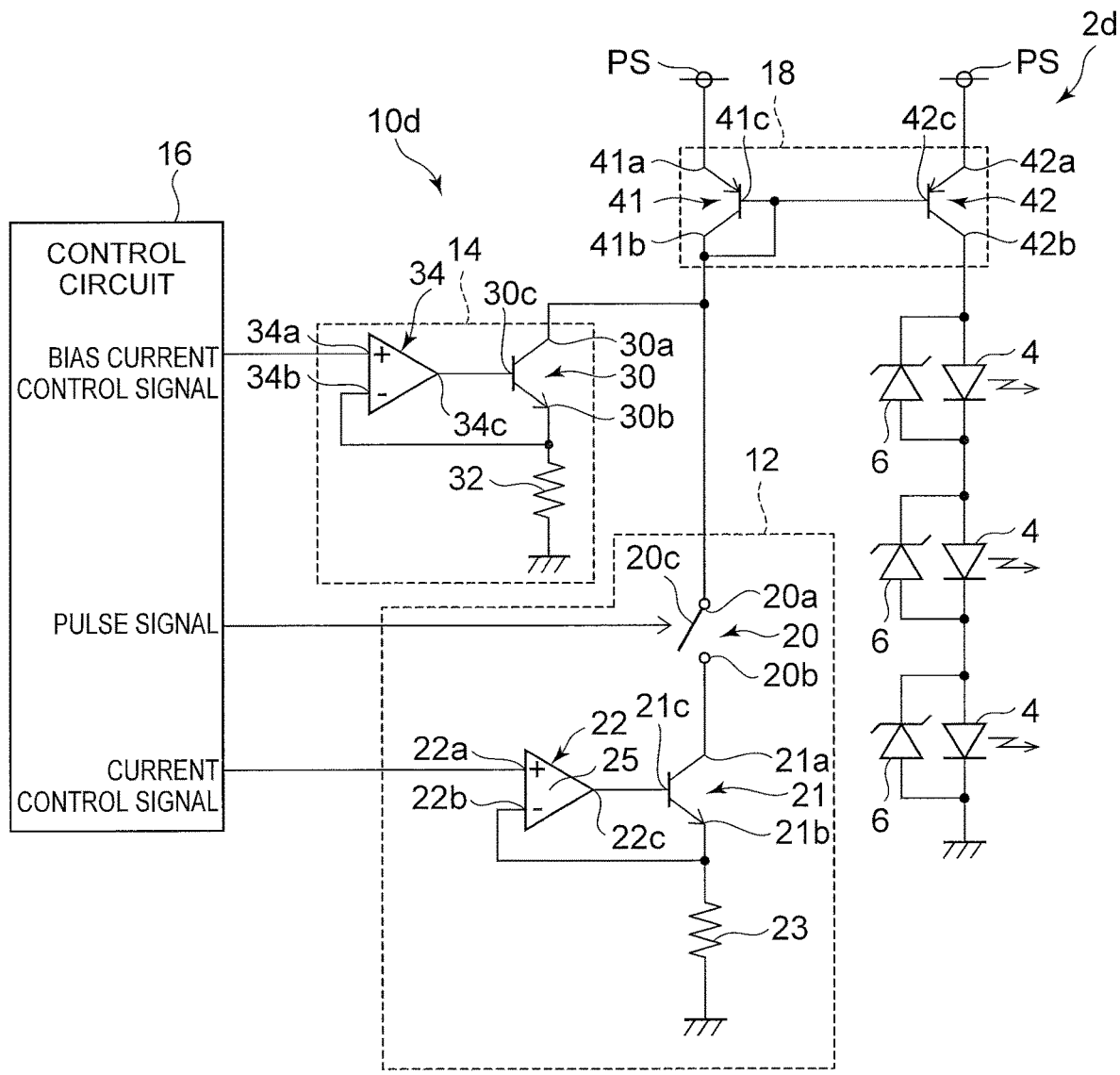
FIG. 8 is a circuit diagram schematically illustrating the modification example of the drive circuit and the light source device, according to the first embodiment.

FIG. 8 is a circuit diagram schematically illustrating the modification example of the drive circuit and the light source device, according to the first embodiment. As illustrated in FIG. 8, in a light source device 2d and a drive circuit 10d, the drive circuit 10d includes a current mirror circuit 18.

The current mirror circuit 18 includes two transistors 41, 42. The transistor 41 includes a pair of main terminals 41a, 41b, and a control terminal 41c. Similarly, the transistor 42 includes a pair of main terminals 42a, 42b and a control terminal 42c. The transistors 41, 42 are, for example, pnp type bipolar transistors. The main terminals 41a, 42a are, for example, emitters. The main terminals 41b, 42b are, for example, collectors. The control terminals 41c, 42c are, for example, bases.

The main terminals 41a, 42a of the transistors 41, 42 are electrically connected to the direct current power supply PS. The control terminal 41c of the transistor 41 is electrically connected to the control terminal 42c of the transistor 42. Also, the control terminal 41c of the transistor 41 is electrically connected to the main terminal 41b of the transistor 41.

Thus, the current mirror circuit 18 causes the magnitude of the current supplied between the main terminals 42a and 42b of the transistor 42 to be substantially equal to the magnitude of the current supplied between the main terminals 41a and 41b of the transistor 41.

The transistors 41, 42 are not limited to bipolar transistors, but can be FETs, etc.

In the drive circuit 10d, the light-emitting element 4 is electrically connected to the direct current power supply PS via the current mirror circuit 18. The light-emitting element 4 is electrically connected to the main terminal 42b of the transistor 42, for example, and is electrically connected to the direct current power supply PS via the transistor 42.

The light-emitting element 4 is provided between the transistor 42 and the terminal of the common potential. For example, in a case in which the light-emitting element 4 is a laser diode, the anode of the light-emitting element 4 is electrically connected to the direct current power supply PS via the transistor 42, and the cathode of the light-emitting element 4 is electrically connected to the terminal of the common potential. Thus, in the drive circuit 10d, the magnitude of current supplied to the transistor 41 is controlled, whereby the magnitude of current supplied to the transistor 42 and the light-emitting element 4 can be controlled, Note that in FIG. 8, three light-emitting elements 4 are connected in series to the transistor 42 of the current mirror circuit 18. The number of light-emitting elements 4 connected to the transistor 42 of the current mirror circuit 18 is not limited thereto, and can be two or four or more, or one. The number of light-emitting elements 4 connected to the transistor 42 of the current mirror circuit 18 can be a discretionary number.

The switching circuit 12 is electrically connected to the transistor 41 of the current mirror circuit 18. The switching circuit 12 is provided, for example, between the main terminal 41b of the transistor 41 and the terminal of the common potential.

Thus, for example, when the switching element 20 is turned on, a current is supplied to the transistor 41 and the switching element 20, and a current having substantially the same magnitude as the current supplied to the transistor 41 is supplied to the transistor 42 and the light-emitting element 4, so that light is emitted from the light-emitting element 4. That is, when the switching element 20 is turned on and a current having a magnitude equal to or greater than the threshold current is supplied to the light-emitting element 4, the first state is established in which light is emitted from the light-emitting element 4.

Then, by turning off the switching element 20, the current supplied to the transistor 41 is set less than the threshold current of the light-emitting element 4, and the current supplied to the transistor 42 and the light-emitting element 4 is also set less than the threshold current of the light-emitting element 4. By turning off the switching element 20, the second state is established in which the magnitude of the current supplied to the light-emitting element 4 is less than the threshold current. In this manner, the drive circuit 10d causes the light-emitting element 4 to perform pulse oscillation by switching between the on state and the off state of the switching element 20.

Note that, as described with respect to FIG. 7, also when the current flowing through the switching element 21 is controlled, the light-emitting element 4 connected to the transistor 42 of the current mirror circuit 18 can be caused to perform pulse oscillation.

The direct current adjustment circuit 14 is electrically connected between the transistor 41 of the current mirror circuit 18 and the switching circuit 12. Thus, the direct current adjustment circuit 14 can supply a current to the path of the transistor 41, the transistor 30, and the resistive element 32 of the current mirror circuit 18 even when the switching circuit 12 is in the second state, for example, by applying a voltage having a predetermined magnitude to the control terminal 30c of the transistor 30.

At this time, a current having substantially the same magnitude as the magnitude of the transistor 41 is also supplied to the transistor 42 of the current mirror circuit 18, and a bias current having substantially the same magnitude is also supplied to the light-emitting element 4 via the transistor 42. As a result, in the direct current adjustment circuit 14, when the switching circuit 12 is in the second state in which the magnitude of the current supplied to the light-emitting element 4 is less than the threshold current, the bias current having a predetermined magnitude less than the threshold current can be supplied to the light-emitting element 4. The direct current adjustment circuit 14 can supply a bias current having a predetermined magnitude less than the threshold current to the light-emitting element 4 in a state where the switching circuit 12 substantially stops the supply of current to the light-emitting element 4.

Accordingly, even in the light source device 2d and the drive circuit 10d, the same effects as those of the above-described embodiments can be obtained. The switching circuit 12 and the direct current adjustment circuit 14 can directly control the current flowing through the light-emitting element 4, or can control the current through the current mirror circuit 18, etc.

Second Embodiment

Figure 9:
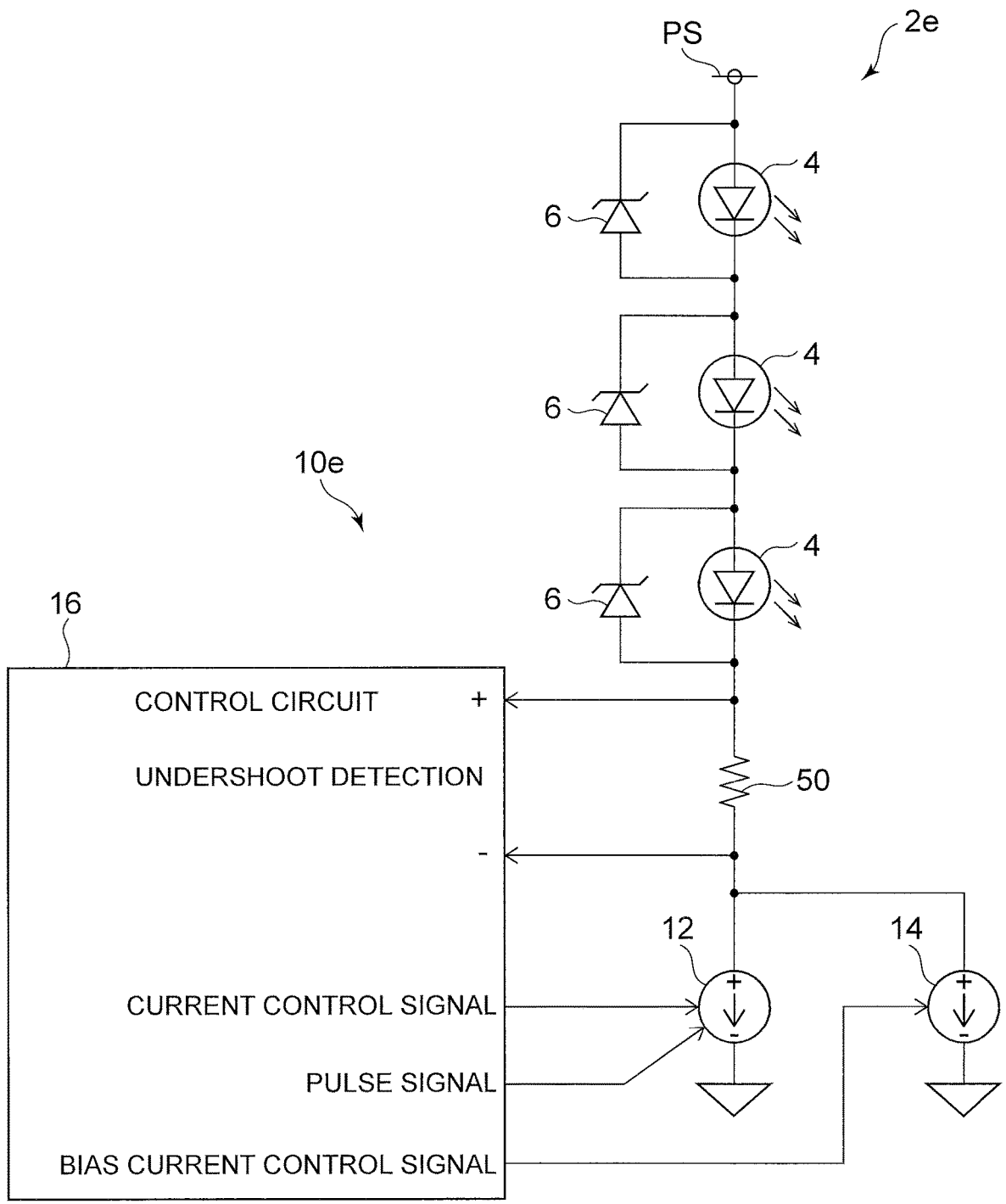
FIG. 9 is a circuit diagram schematically illustrating a drive circuit and a light source device, according to a second embodiment.

FIG. 9 is a circuit diagram schematically illustrating a drive circuit and a light source device, according to a second embodiment.

As illustrated in FIG. 9, in a light source device 2e and a drive circuit 10e, the drive circuit 10e further includes a resistive element 50.

In the drive circuit 10e, one end of the light-emitting element 4 is electrically connected to the direct current power supply PS, and the other end of the light-emitting element 4 is electrically connected to one end of the resistive element 50. In this example, the light source device 2e includes three light-emitting elements 4 connected in series. The number of light-emitting elements 4 is not limited thereto, and can be a discretionary number.

The other end of the resistive element 50 is electrically connected to the switching circuit 12. The direct current adjustment circuit 14 is electrically connected between the resistive element 50 and the switching circuit 12. Thus, a voltage corresponding to the current supplied to the light-emitting element 4 is generated at both ends of the resistive element 50. Accordingly, the magnitude of the current supplied to the light-emitting element 4 can be detected by the resistive element 50. The resistive element 50 is a resistive element for detecting the magnitude of the current supplied to the light-emitting element 4.

The control circuit 16 is electrically connected between the light-emitting element 4 and the resistive element 50, and between the resistive element 50 and the switching circuit 12. For example, the control circuit 16 detects at least one of the voltage applied to the light-emitting element 4 and the current supplied to the light-emitting element 4 based on the voltage at both ends of the resistive element 50.

Note that the configuration of detecting at least one of the voltage applied to the light-emitting element 4 and the current supplied to the light-emitting element 4 is not limited to the above, and can be a discretionary configuration that can detect at least one of the voltage applied to the light-emitting element 4 and the current supplied to the light-emitting element 4. For example, the current supplied to the light-emitting element 4 can be detected by a change in magnetic flux, such as a clamp current meter. In this case, the resistive element 50 can be omitted. The resistive element 50 can be appropriately provided as needed.

The control circuit 16 controls the operation of the direct current adjustment circuit 14 to detect the magnitude of undershoot based on the detection result of at least one of the voltage applied to the light-emitting element 4 and the current supplied to the light-emitting element 4, such that the bias current having the magnitude corresponding to the magnitude of the detected undershoot is supplied to the light-emitting element 4.

For example, in the case of a configuration in which the direct current adjustment circuit 14 includes the differential amplifier circuit 34 described in FIG. 6 or the like, the control circuit 16 controls the operation of the direct current adjustment circuit 14 such that the bias current having the magnitude corresponding to the magnitude of the detected undershoot is supplied to the light-emitting element 4 by generating the reference signal of the differential amplifier circuit 34 having the magnitude corresponding to the magnitude of the detected undershoot and inputting the generated reference signal to the first input terminal 34a of the differential amplifier circuit 34.

In a case in which the magnitude of the detected undershoot is less than the threshold current of the light-emitting element 4, the control circuit 16 controls the operation of the direct current adjustment circuit 14 such that the magnitude of the bias current supplied to the light-emitting element 4 becomes greater than the magnitude of the detected undershoot by a predetermined amount, when the switching circuit 12 is in the second state.

For example, in a configuration in which the direct current adjustment circuit 14 includes the differential amplifier circuit 34, in a case in which the magnitude of the detected undershoot is less than the threshold current of the light-emitting element 4, the control circuit 16 generates the reference signal of the differential amplifier circuit 34 such that the magnitude of the bias current supplied to the light-emitting element 4 is greater than the magnitude of the detected undershoot by a predetermined amount when the switching circuit 12 is in the second state.

On the other hand, when the magnitude of the detected undershoot is equal to or greater than the threshold current of the light-emitting element 4, the control circuit 16 controls the operation of the direct current adjustment circuit 14 such that the magnitude of the bias current supplied to the light-emitting element 4 becomes less than the threshold current of the light-emitting element 4 by a predetermined amount when the switching circuit 12 is in the second state.

For example, in a configuration in which the direct current adjustment circuit 14 includes the differential amplifier circuit 34, in a case in which the magnitude of the detected undershoot is equal to or greater than the threshold current of the light-emitting element 4, the control circuit 16 generates the reference signal of the differential amplifier circuit 34 such that the magnitude of the bias current supplied to the light-emitting element 4 is less than the threshold current of the light-emitting element 4 by a predetermined amount when the switching circuit 12 is in the second state.

In this manner, in the drive circuit 10e, the control circuit 16 controls the operation of the direct current adjustment circuit 14 to detect the magnitude of undershoot based on the detection result of at least one of the voltage applied to the light-emitting element 4 and the current supplied to the light-emitting element 4, such that the bias current having the magnitude corresponding to the magnitude of the detected undershoot is supplied to the light-emitting element 4. Accordingly, even in a case in which the magnitude of undershoot varies, the change in voltage and current into the reverse direction of the light-emitting element 4 can be appropriately suppressed at the falling edge of the pulse oscillation of the voltage applied to the light-emitting element 4 and the current supplied to the light-emitting element 4, and an increase in power consumption due to the supply of the bias current can be appropriately suppressed. Furthermore, the labor of manually adjusting the magnitude of the bias current can be omitted. The durability and convenience of the light source device 2e can be further improved.

Figure 10:
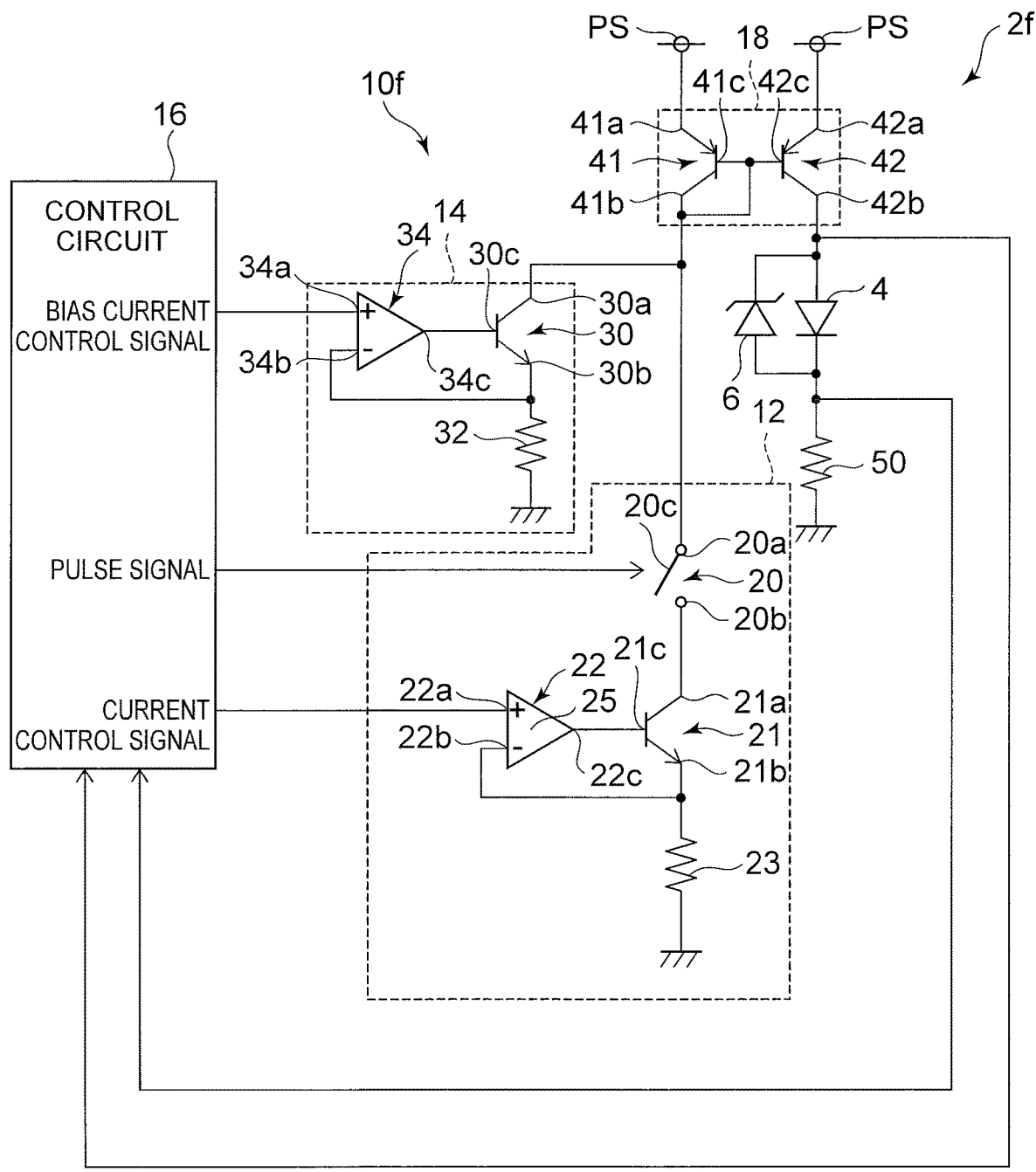
FIG. 10 is a circuit diagram schematically illustrating a modification example of the drive circuit and the light source device, according to the second embodiment.

FIG. 10 is a circuit diagram schematically illustrating a modification example of the drive circuit and the light source device, according to the second embodiment. As illustrated in FIG. 10, in a light source device 2f and a drive circuit 10f, an example in which the resistive element 50 is provided in the configuration having the current mirror circuit 18 is schematically illustrated.

In the drive circuit 10f, the resistive element 50 is provided between the light-emitting element 4 connected to the transistor 42 of the current mirror circuit 18 and the terminal of the common potential. Thus, also in this example, a voltage corresponding to the current supplied to the light-emitting element 4 is generated at both ends of the resistive element 50.

The control circuit 16 is electrically connected between the main terminal 42b of the transistor 42 and the light-emitting element 4, and between the light-emitting element 4 and the resistive element 50. The control circuit 16 detects at least one of the voltage applied to the light-emitting element 4 and the current supplied to the light-emitting element 4 based on, for example, the voltage applied to the light-emitting element 4 and the voltage of the resistive element 50.

Accordingly, even in the drive circuit 10f having the current mirror circuit 18, similarly to the drive circuit 10e described with respect to FIG. 9, the control circuit 16 can control the operation of the direct current adjustment circuit 14 to detect the magnitude of undershoot based on the detection result of at least one of the voltage applied to the light-emitting element 4 and the current supplied to the light-emitting element 4, such that the bias current having the magnitude corresponding to the magnitude of the detected undershoot is supplied to the light-emitting element 4.

As described above, the configuration of the direct current adjustment circuit 14 in which the magnitude of the undershoot is detected and the operation of the direct current adjustment circuit 14 is controlled such that the bias current having the magnitude corresponding to the detected magnitude of the undershoot is supplied to the light-emitting element 4 is not limited to the configuration including the current mirror circuit 18, and can be a configuration without the current mirror circuit 18.

The embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various modified examples and modifications, and those modified examples and modifications will also fall within the scope of the present invention.

What is claimed is:

1. A drive circuit comprising:
   a switching circuit configured to switch between a first state and a second state to cause a light-emitting element to perform pulse oscillation, wherein,
      in the first state, light is emitted from the light-emitting element by supplying the light-emitting element with a current having a magnitude equal to or greater than a threshold current that enables the light-emitting element to emit light having an output equal to or greater than a predetermined output, and
      in the second state, the magnitude of the current supplied to the light-emitting element is less than the threshold current;
   a direct current adjustment circuit configured to supply, to the light-emitting element, a bias current within a range less than the threshold current of the light-emitting element in the second state, the bias current having a magnitude corresponding to a magnitude of undershoot occurring at a falling edge of the pulse oscillation; and
   a control circuit configured to control operation of the direct current adjustment circuit to detect the magnitude of the undershoot occurring at the falling edge of the pulse oscillation based on a detection result of at least one of a voltage applied to the light-emitting element or the current supplied to the light-emitting element, such that the bias current having the magnitude corresponding to the magnitude of the detected undershoot is supplied to the light-emitting element.

2. The drive circuit according to claim 1, wherein
   the control circuit is configured to control the operation of the direct current adjustment circuit such that when the magnitude of the detected undershoot is less than the threshold current, the magnitude of the bias current is greater than the magnitude of the detected undershoot by a predetermined amount.

3. The drive circuit according to claim 1, wherein
   the control circuit is configured to control the operation of the direct current adjustment circuit such that when the magnitude of the detected undershoot is equal to or greater than the threshold current, the magnitude of the bias current is less than the threshold current by a predetermined amount.

4. The drive circuit according to claim 1, further comprising
   a resistive element being provided between the light-emitting element and the switching circuit, wherein
   the direct current adjustment circuit is electrically connected between the resistive element and the switching circuit,
   the control circuit is electrically connected between the light-emitting element and the resistive element, and between the resistive element and the switching circuit, and
   the control circuit is configured to detect at least one of the voltage applied to the light-emitting element and the current supplied to the light-emitting element based on a voltage at both ends of the resistive element.

5. The drive circuit according to claim 1, further comprising:
   a current mirror circuit including a first transistor and a second transistor; and
   a resistive element, wherein the light-emitting element is electrically connected to the first transistor, the switching circuit is electrically connected to the second transistor, the switching circuit being configured to control a magnitude of a current supplied to the first transistor and the light-emitting element by controlling a magnitude of a current supplied to the second transistor, the resistive element is provided between the light-emitting element and a terminal of a common potential, and the control circuit is electrically connected between the first transistor and the light-emitting element, and between the light-emitting element and the resistive element, the control circuit being configured to detect at least one of the voltage applied to the light-emitting element and the current supplied to the light-emitting element based on the voltage applied to the light-emitting element and a voltage applied to the resistive element.

6. The drive circuit according to claim 1, wherein
the switching circuit includes a first switching element and a second switching element,
the first switching element is configured to perform switching between the first state and the second state,
the second switching element is configured to adjust the magnitude of the current supplied to the light-emitting element, and
the control circuit is configured to control switching between the first state and the second state by controlling switching of the first switching element.

7. The drive circuit according to claim 1, wherein
the switching circuit includes a switching element, a resistive element, and a differential amplifier circuit,
the switching element is configured to adjust the magnitude of the current supplied to the light-emitting element,
the resistive element is configured to detect the magnitude of the current supplied to the light-emitting element,
the differential amplifier circuit is configured to control the current supplied to the light-emitting element so that the magnitude of the current supplied to the light-emitting element is constant based on a reference signal and a detection signal detected by the resistive element, and
the control circuit is configured to control switching between the first state and the second state by controlling the reference signal input to the differential amplifier circuit.

8. A drive circuit comprising:
a switching circuit configured to switch between a first state and a second state to cause a light-emitting element to perform pulse oscillation, wherein,
in the first state, light is emitted from the light-emitting element by supplying the light-emitting element with a current having a magnitude equal to or greater than a threshold current that enables the light-emitting element to emit light having an output equal to or greater than a predetermined output, and
in the second state, the magnitude of the current supplied to the light-emitting element is less than the threshold current; and
a direct current adjustment circuit configured to supply, to the light-emitting element, a bias current within a range less than the threshold current of the light-emitting element in the second state, the bias current having a magnitude corresponding to a magnitude of undershoot occurring at a falling edge of the pulse oscillation, wherein
the direct current adjustment circuit includes:
a transistor configured to adjust a magnitude of the bias current;
a resistive element configured to detect the magnitude of the bias current; and
a circuit configured to control a current supplied to the transistor based on a reference signal serving as a reference of the magnitude of the bias current and a detection signal corresponding to a detection result obtained by the resistive element such that the bias current having the magnitude corresponding to the reference signal is supplied to the light-emitting element.

9. The drive circuit according to claim 8, further comprising
a control circuit configured to control operation of the direct current adjustment circuit to detect the magnitude of the undershoot occurring at the falling edge of the pulse oscillation based on a detection result of at least one of a voltage applied to the light-emitting element or the current supplied to the light-emitting element, such that the bias current having the magnitude corresponding to the magnitude of the detected undershoot is supplied to the light-emitting element.

10. The drive circuit according to claim 9, wherein
the control circuit is configured to control the operation of the direct current adjustment circuit such that when the magnitude of the detected undershoot is less than the threshold current, the magnitude of the bias current is greater than the magnitude of the detected undershoot by a predetermined amount.

11. The drive circuit according to claim 9, wherein
the control circuit is configured to control the operation of the direct current adjustment circuit such that when the magnitude of the detected undershoot is equal to or greater than the threshold current, the magnitude of the bias current is less than the threshold current by a predetermined amount.

12. The drive circuit according to claim 9, further comprising
a resistive element being provided between the light-emitting element and the switching circuit, wherein
the direct current adjustment circuit is electrically connected between the resistive element and the switching circuit,
the control circuit is electrically connected between the light-emitting element and the resistive element, and between the resistive element and the switching circuit, and
the control circuit is configured to detect at least one of the voltage applied to the light-emitting element and the current supplied to the light-emitting element based on a voltage at both ends of the resistive element.

13. The drive circuit according to claim 9, further comprising:
a current mirror circuit including a first transistor and a second transistor; and
a resistive element, wherein
the light-emitting element is electrically connected to the first transistor,
the switching circuit is electrically connected to the second transistor, the switching circuit being configured to control a magnitude of a current supplied to the first transistor and the light-emitting element by controlling a magnitude of a current supplied to the second transistor, the resistive element is provided between the light-emitting element and a terminal of a common potential, and the control circuit is electrically connected between the first transistor and the light-emitting element, and between the light-emitting element and the resistive element, the control circuit being configured to detect at least one of the voltage applied to the light-emitting element and the current supplied to the light-emitting element based on the voltage applied to the light-emitting element and a voltage applied to the resistive element.

14. The drive circuit according to claim 9, wherein
the switching circuit includes a first switching element and a second switching element,
the first switching element is configured to perform switching between the first state and the second state,
the second switching element is configured to adjust the magnitude of the current supplied to the light-emitting element, and
the control circuit is configured to control switching between the first state and the second state by controlling switching of the first switching element.

15. The drive circuit according to claim 9, wherein
the switching circuit includes a switching element, a resistive element, and a differential amplifier circuit,
the switching element is configured to adjust the magnitude of the current supplied to the light-emitting element,
the resistive element is configured to detect the magnitude of the current supplied to the light-emitting element,
the differential amplifier circuit is configured to control the current supplied to the light-emitting element so that the magnitude of the current supplied to the light-emitting element is constant based on the reference signal and the detection signal that are detected by the resistive element, and
the control circuit is configured to control switching between the first state and the second state by controlling the reference signal input to the differential amplifier circuit.

16. A light source device comprising:
a light-emitting element; and
a drive circuit configured to drive the light-emitting element, wherein
the drive circuit comprises:
  a switching circuit configured to switch between a first state and a second state to cause the light-emitting element to perform pulse oscillation, wherein,
    in the first state, light is emitted from the light-emitting element by supplying the light-emitting element with a current having a magnitude equal to or greater than a threshold current that enables the light-emitting element to emit light having an output equal to or greater than a predetermined output, and
    in the second state, the magnitude of the current supplied to the light-emitting element is less than the threshold current;
  a direct current adjustment circuit configured to supply, to the light-emitting element, a bias current within a range less than the threshold current of the light-emitting element in the second state, the bias current having a magnitude corresponding to a magnitude of undershoot occurring at a falling edge of the pulse oscillation; and
  a control circuit configured to control operation of the direct current adjustment circuit to detect the magnitude of the undershoot occurring at the falling edge of the pulse oscillation based on a detection result of at least one of a voltage applied to the light-emitting element or the current supplied to the light-emitting element, such that the bias current having the magnitude corresponding to the magnitude of the detected undershoot is supplied to the light-emitting element.

17. A light source device comprising:
a light-emitting element; and
a drive circuit configured to drive the light-emitting element, wherein
the drive circuit comprises:
  a switching circuit configured to switch between a first state and a second state to cause the light-emitting element to perform pulse oscillation, wherein,
    in the first state, light is emitted from the light-emitting element by supplying the light-emitting element with a current having a magnitude equal to or greater than a threshold current that enables the light-emitting element to emit light having an output equal to or greater than a predetermined output, and
    in the second state, the magnitude of the current supplied to the light-emitting element is less than the threshold current; and
  a direct current adjustment circuit configured to supply, to the light-emitting element, a bias current within a range less than the threshold current of the light-emitting element in the second state, the bias current having a magnitude corresponding to a magnitude of undershoot occurring at a falling edge of the pulse oscillation, wherein
the direct current adjustment circuit includes:
  a transistor configured to adjust a magnitude of the bias current;
  a resistive element configured to detect the magnitude of the bias current; and
  a circuit configured to control a current supplied to the transistor based on a reference signal serving as a reference of the magnitude of the bias current and a detection signal corresponding to a detection result obtained by the resistive element such that the bias current having the magnitude corresponding to the reference signal is supplied to the light-emitting element.

18. The light source device according to claim 17, further comprising
a control circuit configured to control operation of the direct current adjustment circuit to detect the magnitude of the undershoot occurring at the falling edge of the pulse oscillation based on a detection result of at least one of a voltage applied to the light-emitting element or the current supplied to the light-emitting element, such that the bias current having the magnitude corresponding to the magnitude of the detected undershoot is supplied to the light-emitting element.

* * * * *